310-11 SR SEARCH ROOM
F116A OR 3,239,697

March 8, 1966 Z. J. J. STEKLY 3,239,697
ELECTRIC GENERATOR
Filed Dec. 30, 1960 9 Sheets-Sheet 1

ZDENEK J.J. STEKLY
*INVENTOR.*

BY Alden D. Redfield
Melvin E. Frederick
ATTORNEYS

ZDENEK J. J. STEKLY
INVENTOR.

BY Alden D. Redfield
Melvin E. Frederick
ATTORNEYS

March 8, 1966 Z. J. J. STEKLY 3,239,697

ELECTRIC GENERATOR

Filed Dec. 30, 1960 9 Sheets-Sheet 3

ZDENEK J.J. STEKLY
INVENTOR.

BY Alden D. Redfield
Melvin E. Frederick
ATTORNEYS

ZDENEK J.J. STEKLY
INVENTOR.

BY Alden D. Redfield
Melvin E. Frederick
ATTORNEYS

March 8, 1966 Z. J. J. STEKLY 3,239,697

ELECTRIC GENERATOR

Filed Dec. 30, 1960 9 Sheets-Sheet 5

ZDENEK J. J. STEKLY
*INVENTOR.*

BY Alden D. Redfield
Melvin E. Frederick
ATTORNEYS

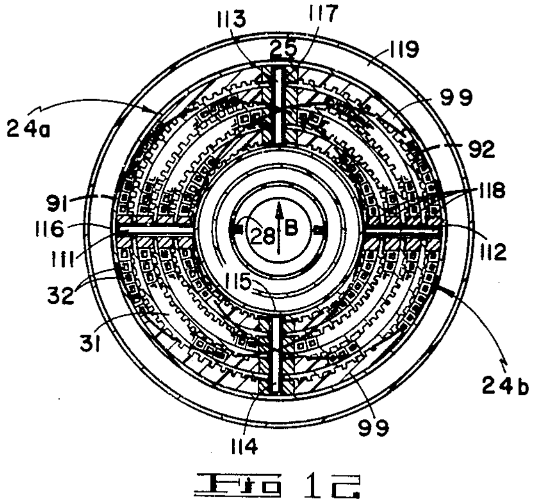
FIG. 12
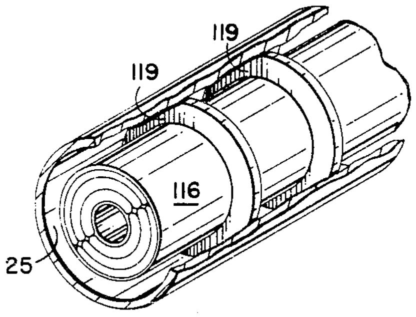
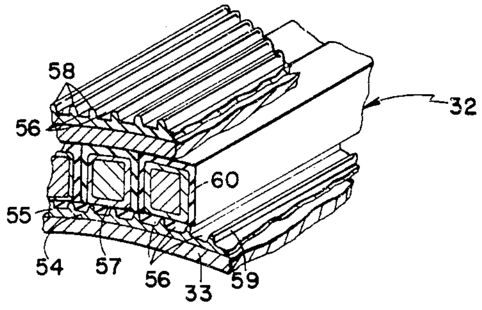
FIG. 13 FIG. 6
ZDENEK J.J. STEKLY
*INVENTOR.*
BY Alden D. Redfield
Melvin E. Frederick
ATTORNEYS March 8, 1966 Z. J. J. STEKLY 3,239,697

ELECTRIC GENERATOR

Filed Dec. 30, 1960 9 Sheets-Sheet 7

ZDENEK J. J. STEKLY
*INVENTOR.*

BY Alden D. Redfield
Melvin E. Frederick
ATTORNEYS

March 8, 1966 Z. J. J. STEKLY 3,239,697

ELECTRIC GENERATOR

Filed Dec. 30, 1960 9 Sheets-Sheet 8

ZDENEK J.J. STEKLY
*INVENTOR.*

BY Alden D. Redfield
Melvin E. Frederick
ATTORNEYS

March 8, 1966 Z. J. J. STEKLY 3,239,697

ELECTRIC GENERATOR

Filed Dec. 30, 1960 9 Sheets-Sheet 9

ZDENEK J. J. STEKLY
*INVENTOR.*

BY Alden D. Redfield
Melvin E. Frederick
ATTORNEYS 3,239,697

ELECTRIC GENERATOR

Zdenek J. J. Stekly, Peabody, Mass., assignor to Avco Corporation, Cincinnati, Ohio, a corporation of Delaware Filed Dec. 30, 1960, Ser. No. 79,678
14 Claims. (Cl. 310—11)

This invention relates to electric generators and, more particularly, to magnetohydrodynamic (hereinafter abbreviated "MHD") electric generators wherein the necessary magnetic field is supplied by high field strength magnetic coils operating at cryogenic temperatures. More specifically, the invention relates to high field strength cryogenic coils for supplying the magnetic field required by MHD generators.

In general terms, MHD generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, a recovery system including pumping means for returning the gas to the source.

Several different gases may be used; the gas may simply be air, combustion products, or may comprise inert gases, such as helium or argon. In open systems, i.e., those in which the gases are not recovered after passing through the power plant, air or combustion products are normally used. In closed systems, in which the gases are recovered and recirculated, it is feasible to use relatively expensive gases, such as helium and argon. To promote electrical conductivity, the gases are heated to high temperature; conductivity may also be increased by the addition to the gases of a substance that ionizes readily at the operating temperature. Regardless of the gas used, it comprises a mixture of electrons, positive ions and neutral atoms which, for convenience, may be termed "plasma."

Since the electrical conductivity of the plasma increases as temperature increases, it is possible by introducing the plasma into the generator at very high temperatures to generate a given amount of power in a relatively smaller generator as compared to a generator utilizing a plasma at lower temperatures. Further, the length of the generator may be reduced as the magnetic field strength of the generator is increased. Thus, in general terms, the higher the gas temperature and the higher the magnetic field strength, the smaller will be an MHD generator for a given power output. It has been determined that duct length of an MHD generator is inversely proportional to the magnetic field strength squared and, since heat transfer to the wall of the duct and the power necessary to energize the field coils are the major sources of loss in MHD generators operated at high temperatures, the need for a high field strength magnet with low power dissipation is apparent.

Obviously, an MHD generator designed to generate power for commercial distribution must of necessity employ a large magnet for providing the necessary field strength which may be as large as 100,000 gauss or more. Further, since ferromagnetic materials are of little help at high field strengths, heretofore use has been made of air core coils so that the fields which can be reached depend only on the ampere-turns achievable and simple geometrical factors. By way of explanation, such coils are those having an "air core" and that do not rely essentially on the use of or utilize a core of ferromagnetic material to provide a magnetic field. In the case of air core coils the limitations on attainable fields are the heating of the coil conductors and the problems of heat transfer and stress within the coils. Heretofore, the inability to eliminate or satisfactorily overcome the above-mentioned limitations with respect to attaining the required magnetic field has not only limited the design of MHD generators and the total amount of power available therefrom, but also gives rise to a major inefficiency, i.e., the necessity of supplying a large amount of power to energize the field coils which provide the magnetic field necessary for the operation of the MHD generator itself.

At very low or cryogenic temperatures the electrical resistivity of many pure metals drops to a small fraction of its value at room temperature. This fact means that for a given amount of current flow the power dissipated is smaller and the heat transfer rates are considerably less at cryogenic temperatures than at room temperature. Further, in some materials the resistivity falls off with temperature faster than requisite refrigeration power increases, so that by lowering the generating temperature a net saving in power necessary to produce a field over a given volume results. These facts permit the construction of large cryogenic coils that are very efficient in the generation of high magnetic fields.

In view of the preceding discussion, it will now be evident that if the decrease in power dissipation obtained by lowering the temperature of a magnetic coil is greater than the power required by the refrigerating equipment, then a net decrease in the total power requirement for generating a given magnetic field is possible.

For different materials at a given magnetic field strength an optimum cryogenic operating temperature exists, and it is this temperature which determines the maximum gain over a coil at room temperature. An optimum cryogenic temperature exists for the reason that if a coil composed of a given material is operated at a temperature above its optimum cryogenic temperature, the attendant decrease in power dissipation of the coil that may be obtained by reducing the temperature of the coil from the operating temperature to its optimum cryogenic temperature is greater than the increase in power required by the refrigerator to provide the optimum cryogenic temperature. If the coil is operated below its optimum temperature, the attendant decrease in power dissipated by the coil at this lower temperature is less than the increase in power required by the refrigerator to reach this lower temperature.

As has been previously pointed out, the power generated in a given size MHD generator is roughly proportional to the magnetic field squared. The total power required for a cryogenic magnet is proportional to the magnetic field squared and is a function of the operating temperature of the magnet, the efficiency of the refrigerator, and the material used for the conductors of the magnet. Calculations based on the above indicate that the power required to produce the magnetic field for an MHD generator constructed in accordance with the present invention can theoretically be reduced by as much as a factor of 10 as compared with the power required to produce a magnetic field of the same strength for an MHD generator constructed in accordance with the teaching of the prior art, i.e., one that utilizes field coils cooled to about room temperature.

This means that with the same power as supplied to a given conventional MHD field coil, an increase in the magnetic field squared of a factor as much as 10 may be expected by use of cryogenic field coil. Thus, by use of a cryogenic field coil and without any increase in power supplied to the coil a dramatic increase of power output of the generator by a factor of as much as, or more than 10 may be obtained.

Further, as will be more fully pointed out hereinafter, the present invention permits the design of MHD generators having inlet pressures higher than that possible with conventional MHD generators utilizing copper coils operating at room temperature, thereby resulting in an additional increase in efficiency. As is well-known in the electric generating art, the net effect of higher pressure ratios in a conventional turbine-generator unit is an increase in the efficiency with which heat is converted to electricity. This same increase in efficiency occurs in an MHD generator. Thus, the present invention, by permitting a substantial reduction in the power required to provide the magnetic field and by permitting an increase in the efficiency of an MHD generating system, provides a substantial, if not dramatic, advance in the MHD generating art.

Further, the present invention permits the design of MHD generators having reduced operating temperatures without any decrease in efficiency. This is of considerable importance since one of the greatest difficulties in the design and operation of MHD generators is the availability of materials that can withstand the temperatures at which the generator must be operated.

Briefly described, the preferred embodiment of the present invention comprises an MHD generator having a duct and cryogenic coil means for supplying the necessary magnetic field across the duct. The cryogenic coil means may include: conductors arranged around the MHD generator duct to provide a magnetic field that is substantially uniform transverse of the duct and higher at the entrance of the duct that at the exit thereof; means for introducing and removing a coolant to maintain the conductors at their optimum temperature; means for properly insulating the conductors; and means associated with the conductors to impart structural rigidity thereto. The duct may be of such a configuration to permit operation of the generator at pressure ratios greater than the maximum practical pressure ratio heretofore attainable for a a given set of operating conditions.

In view of the foregoing, it will be apparent that it is an object of the present invention to provide an improved electric generator.

Another object of the present invention is to provide an improved high field strength magnetic coil cooled to cryogenic temperatures which requires less power to provide a given magnetic field than conventional magnetic coils.

A further object of the present invention is to provide in an MHD generator a high field strength magnetic coil cooled to cryogenic temperatures that permits a substantial increase in power ouput of a generator by decreasing magnet losses, wall heat transfer losses, and irreversible losses associated with relatively low pressure ratios.

A still further object of the present invention is to provide a cryogenic magnetic coil having a substantially uniform field transverse of the length of the coil.

Another object of the present invention is the provision of a cryogenic magnetic coil comprised of two oppositely disposed portions for providing a substantially uniform field transverse of the length of the coil and a nonuniform field along the length of the coil.

A further object of the present invention is the provision of a cryogenic magnetic coil comprised of two oppositely disposed portions adapted to enclose a divergent duct region for providing within said enclosed duct region a field that is substantially uniform transverse of the length of the coil and greater at one end of the coil than at the opposite end thereof.

A still further object of the present invention is to provide in combination with an MHD generator a high field strength magnetic coil cooled to its optimum temperature by passing a coolant through the coil in the direction of the entrance of the generator duct.

A still further object of the present invention is to provide in combination with an MHD generator a high field strength magnetic coil cooled to its optimum temperature and including reinforcing means that are under compression in a direction perpendicular to the required magnetic field provided by the coil and under tension in a direction parallel to the magnetic field.

Another object of the present invention is the provision of an MHD generator having improved operating characteristics.

A further object of the present invention is the provision of an MHD generator that may operate with reduced temperatures.

A still further object of the present invention is the provision of an MHD generator having a higher pressure ratio than that practically possible with conventional MHD generators utilizing field coils operating at room temperature.

The novel features that are considered characteristic of the present invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 3 is a side view of a partly assembled coil showing the details of a layer of conductors of the opposed portions of the coil forming a part of the present invention;

FIGURE 6 is a fragmentary and pictorial view showing on an enlarged scale a portion of the shells, cooling passages, and conductors;

FIGURE 12 is a sectional end view showing details of reinforcing means for preventing deformation of a high field strength coil in accordance with the present invention;

FIGURE 13 is a perspective view showing in greater detail the reinforcing shell of the embodiment illustrated in FIGURE 12;

Figure 1:
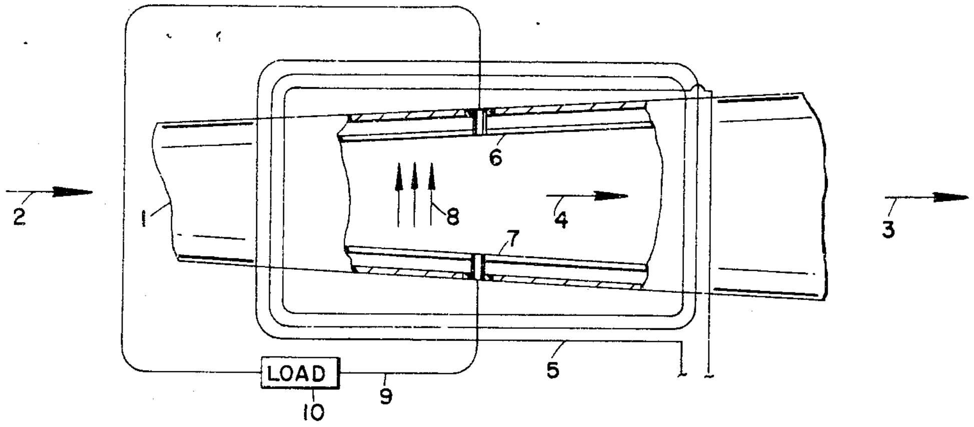
FIGURE 1 is a diagrammatic illustration of an MHD generator.

A knowledge of the general principles of MHD generators will promote an understanding of the present invention. For this reason, there is shown in FIGURE 1 a schematic diagram of an MHD generator. As illustrated in that figure, the generator comprises a duct, generally tapered and designated by the numeral 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason the plasma moves at high velocity through the duct, as indicated by the arrow at 4. By properly choosing the pressure differential and shape of the duct, the plasma can be made to move through the duct at substantially constant velocity, which is desirable, although not necessary, to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct perpendicular to the direction of palsma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional E.M.F. between the electrodes, as indicated by the arrows at 8. The electrodes 6 and 7 are connected by conductor 9 to a load 10 through which electrical current flows under the influence of the E.M.F. induced between the electrodes.

From the foregoing description it will be immediately recognized that an MHD generator of the type described employs a stationary magnetic field and unidirectional gas flow. As a result, such a generator is inherently a source of direct current. If alternating current is desired, specially designed generators or auxiliary equipment must be provided to invert the direct current to alternating current.

The present invention is not, however, directed to the provision of any one type of current, but is directed to increasing the over-all efficiency of an MHD generator, irrespective of the type of current it supplies.

Figure 2:
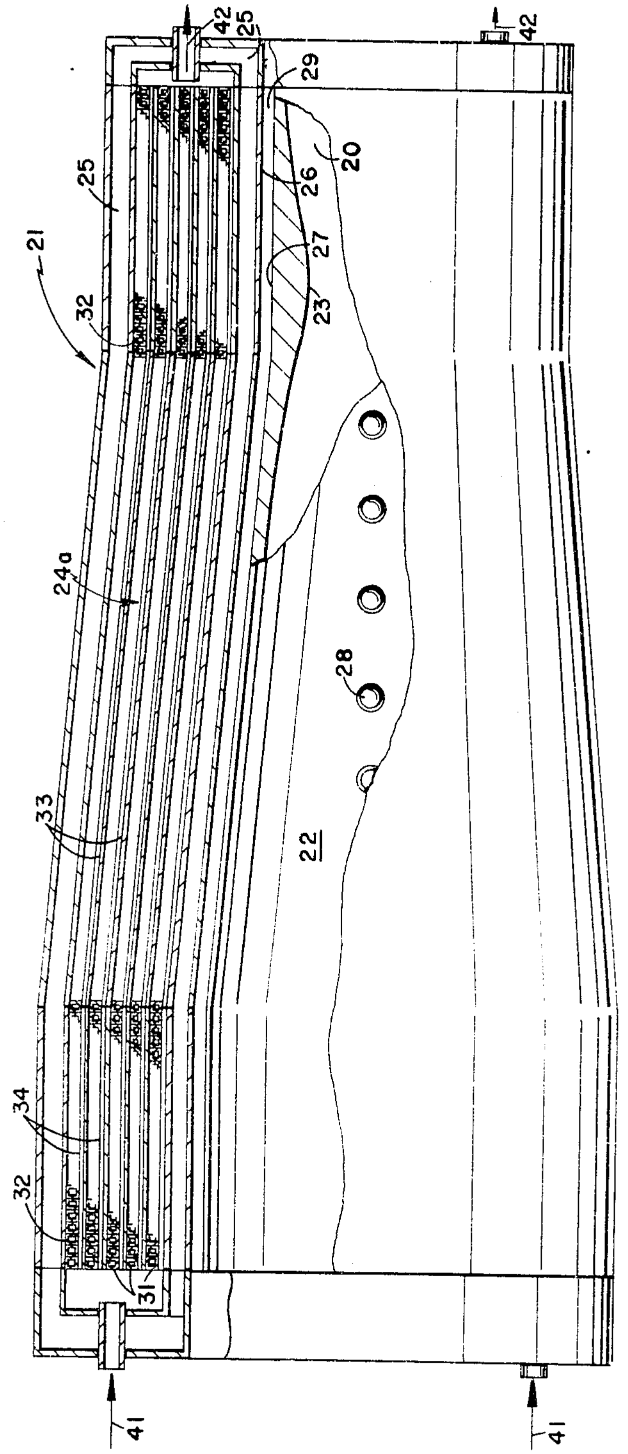
FIGURE 2 is a diagrammatic illustration, partly in section, of an MHD generator in accordance with the present invention.

Shown in FIGURE 2 is a diagrammatic illustration, partly in section, of a combustion chamber 20, a cryogenic coil 21 and a duct 22 for conveying a hot and electrically conductive gas in accordance with the present invention. The electrically nonconductive duct 22, containing a convergent-divergent inlet 23 is surrounded by coil 21 comprised of two oppositely disposed and geometrical portions 24*a*–24*b* (see FIGURES 3 and 11) encapsulated by a vacuum chamber 25 which functions as insulation for the coil. The inner surface 26 of the vacuum chamber 25 is maintained in spaced relationship with the outer surface 27 of the duct 22 to permit access to the electrodes 28 located within the duct and means (not shown), for example, for maintaining the duct at a desirable temperature. The space 29 may, if desired, be filled with suitable insulating material. The oppositely disposed coil portions 24*a*–24*b* are each comprised of a plurality of layers 31 of serially connected conductors 32, the layers being wound on and supported by metal shells 33 having a plurality of axial passages 34 to permit a coolant to be passed along at least some and preferably all of the layers 31 of the coil.

Figure 5:
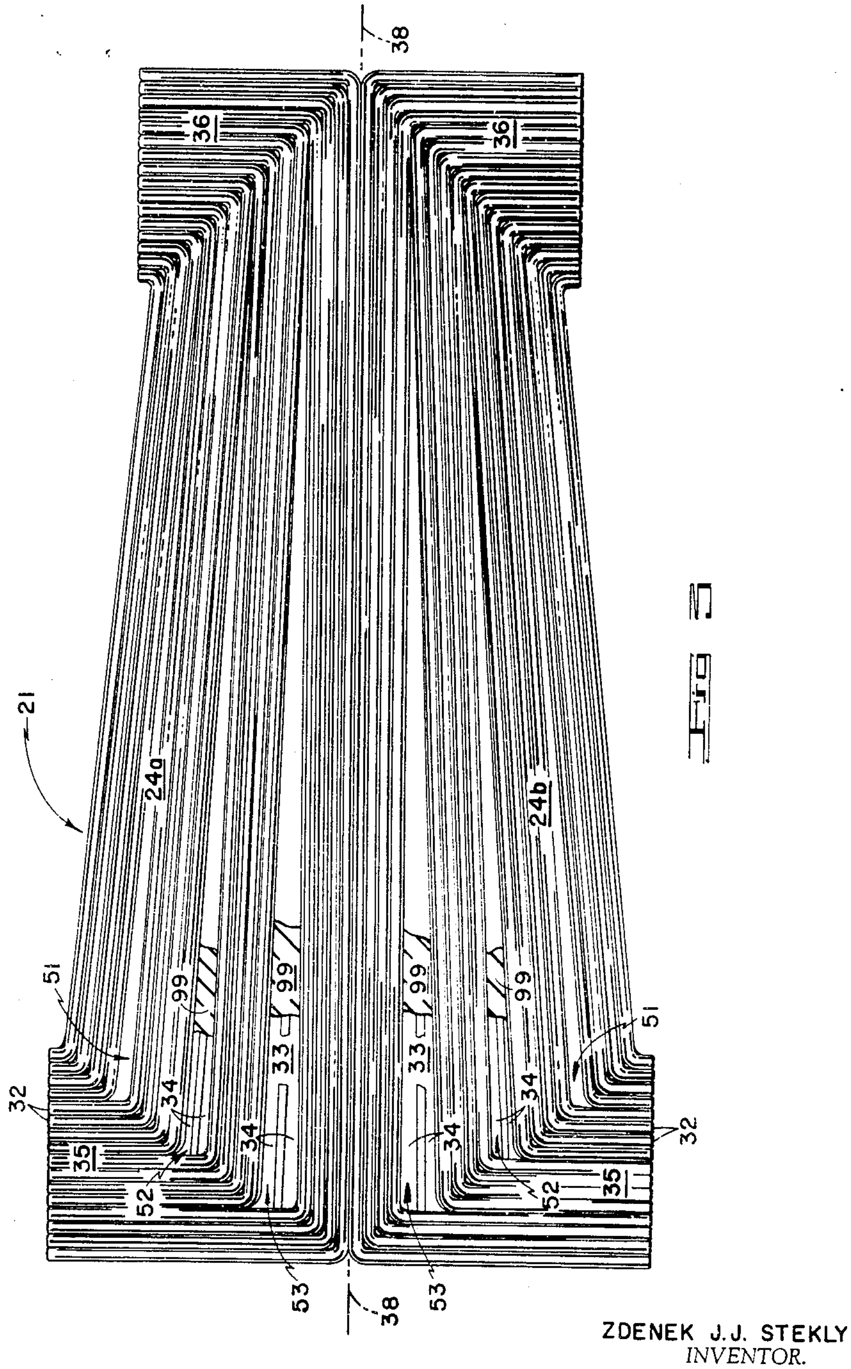
FIGURE 5 is an end view taken on line 5—5 of FIGURE 4.
Figure 4:
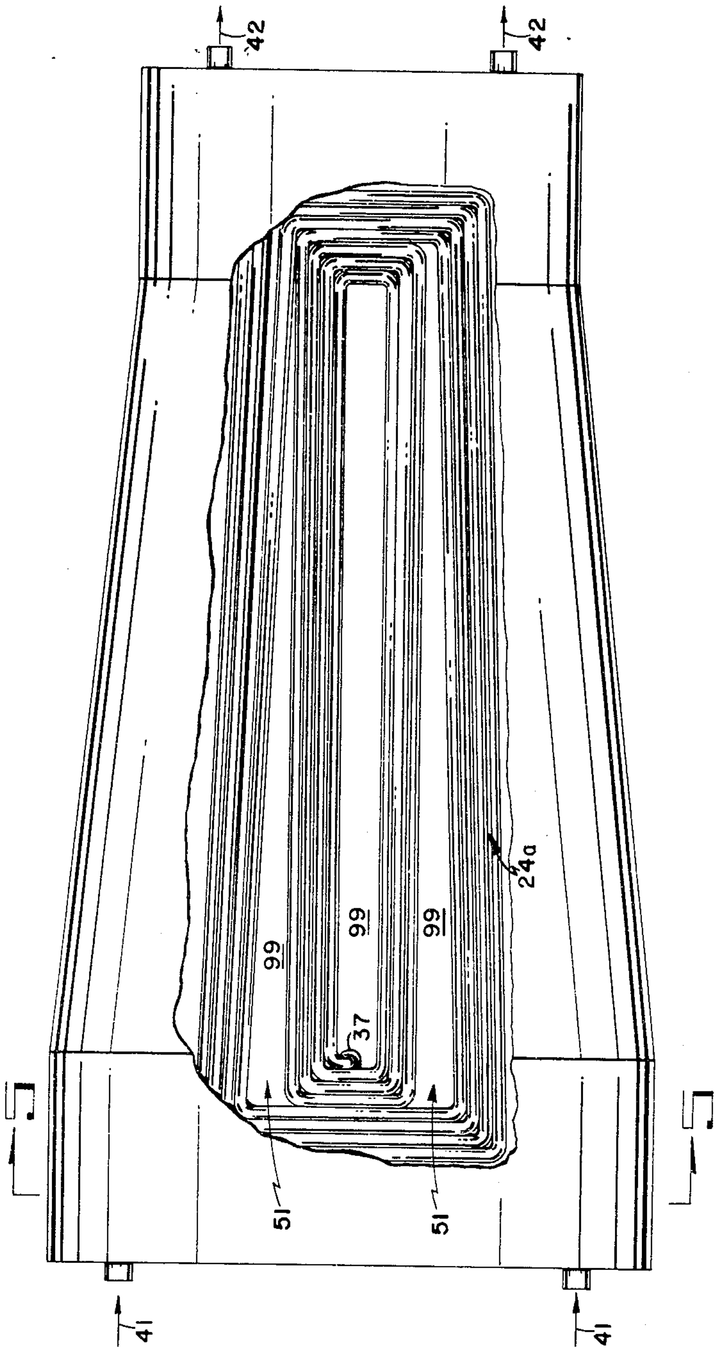
FIGURE 4 is a top view with parts broken away of the layer shown in FIGURE 3.
Figure 5:
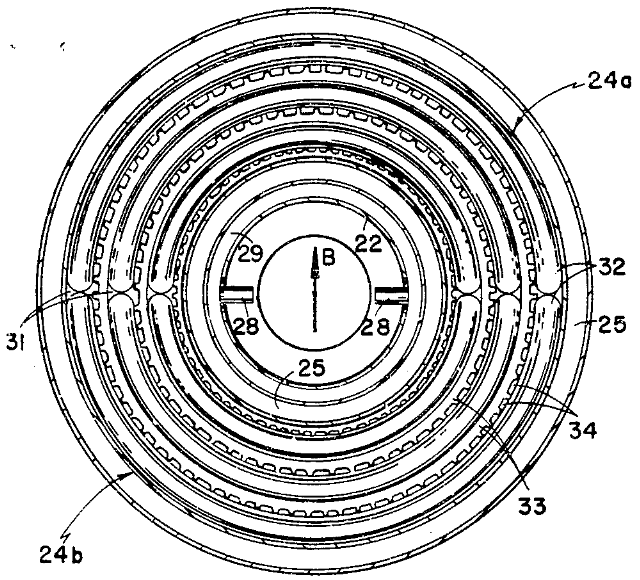

FIGURES 3, 4 and 5 show, by way of example, the coil layers 31 in greater detail. The end portions 35–36 of the continuous or serially connected conductors forming each layer are bent upwardly to a more or less radial position at the duct inlet and outlet to receive and circumferentially encircle substantially one-half of the duct 22. The length of the coil 21 is chosen such that it encompases at least the effective or working length of the duct.

The coil portions 24*a*–24*b* are preferably geometrical and symmetrical about the plane 38 normal to the electrodes and passing through the longitudinal axis of the duct. Coil portions 24*a*–24*b* provide a magnetic field that is substantially constant through and perpendicular to the plane of symmetry 38 and that decreases along the length of the coil in the direction of the outlet or larger end of the duct, as will be more fully explained hereinafter. A coolant, such as helium, is introduced under pressure into the coil through the vacuum chamber 25, as indicated by the arrow at 41. The coolant is supplied from a low temperature source such as a conventional refrigerator (not shown) capable of cooling the coolant to cryogenic temperature. Temperatures less than about −150° C. are considered to be cryogenic temperatures. a refrigerator having a helium gas refrigeration cycle may be used where the refrigerator working gas is passed through the coil. The coolant is exhausted from the coil is indicated by the arrow 42 and returned to the refrigerator in conventional manner.

It is desirable that the field strength decrease in the direction of the duct outlet to prevent the ratio $B/P$ of magnetic flux B and power P from becoming too large and introducing large Hall effects which could have a detrimental effect on the generator. Although the natural increase in the dimensions of a divergent duct is helpful, a desired decrease may be accomplished, for example, as shown in FIGURES 3 and 4, by providing between groups of conductors spaces 51–53 that diverge in the direction of the duct outlet. Spaces 51–53 are filled with a substantially noncompressible and nonconducting material, such as, for example, a suitable thermosetting plastic. Alternately, the portions of the conductor comprising each layer may be equally spaced one from another to achieve the same result, i.e., provision of a decreasing magnet field in the direction of the duct outlet and parallel to the direction of gas flow while simultaneously providing a substantially constant magnetic field across the duct perpendicular to the direction of gas flow. Other satisfactory arrangements incorporating variation in coil diameter and/or variation in ampere-turns of the coil may be used and will readily occur to those skilled in the art.

Current density, coil cross section, conductor configuration and the like can in conventional manner be varied at the expense of structural simplicity to provide a desired magnetic field. The desiderata of design of magnetic coils to provide specific magnetic fields is well-known and forms no part of the present invention. Although not limited to such materials, aluminum and sodium appear to be the most attractive as conductor materials; however, because of certain more desirable characteristics, sodium will be used herein by way of example. Since sodium metal lacks structural strength, the conductor may comprise sodium metal cast in square, thin-wall, stainless steel tubing to facilitate handling of the conductor and the formation of the complete magnetic coil. Insulation of the conductor may be provided, for example, by oxidation or by painting a suitable insulating material on all sides of the conductor except the side exposed to the coolant. Shorting of the conductor to its supporting metal shell may best be prevented by providing insulation on the surface of the shell adjacent the exposed and uninsulated surface of the conductor in the manner described immediately hereinabove. The conductor forming the coil portions is cooled by passing a suitable coolant through longitudinally disposed passages formed in or on the metal shells. Thus, as shown in FIGURE 6 the outer surface 54 of each shell, which may be comprised of high strength steel, is covered with a layer 55 of material such as, for example, aluminum. The layer of aluminum 55 covers each shell 33 and is provided with longitudinally disposed passages 56. If desired, the aluminum may be bonded to the shell. The passages 56, which may have a height-to-width ratio which varies over a wide range, may be formed mechanically or chemically since the dimensions of each passage are relatively small.

As best shown in FIGURE 6, a plurality of passages 56 are provided under each conductor 32 to insure a maximum rate of heat transfer from the conductors to the coolant. Although the entire outer surface of each layer 55 may be covered with insulation as by painting or oxidation to prevent shorting of the uninsulated surface 57 of the conductor to the shell, it is obvious that the same result and an improved heat transfer rate may be achieved if only the crest portion 58 of each projection 59 is insulated. The surfaces of the conductor not directly exposed to the coolant are covered by insulating material 60 in the manner pointed out hereinbefore. The side 57 of the conductor exposed to the coolant preferably is not covered with insulating material in order to permit maximum heat transfer from the conductor to the coolant.

Although a specific arrangement has been described for passing the coolant through the coil, it is to be understood that the invention is not so limited. For example, it is within the purview of the present invention to pass the coolant through the coil in the direction of the outlet of the duct or to circulate the coolant circumferentially or radially through the coil.

Figure 7:
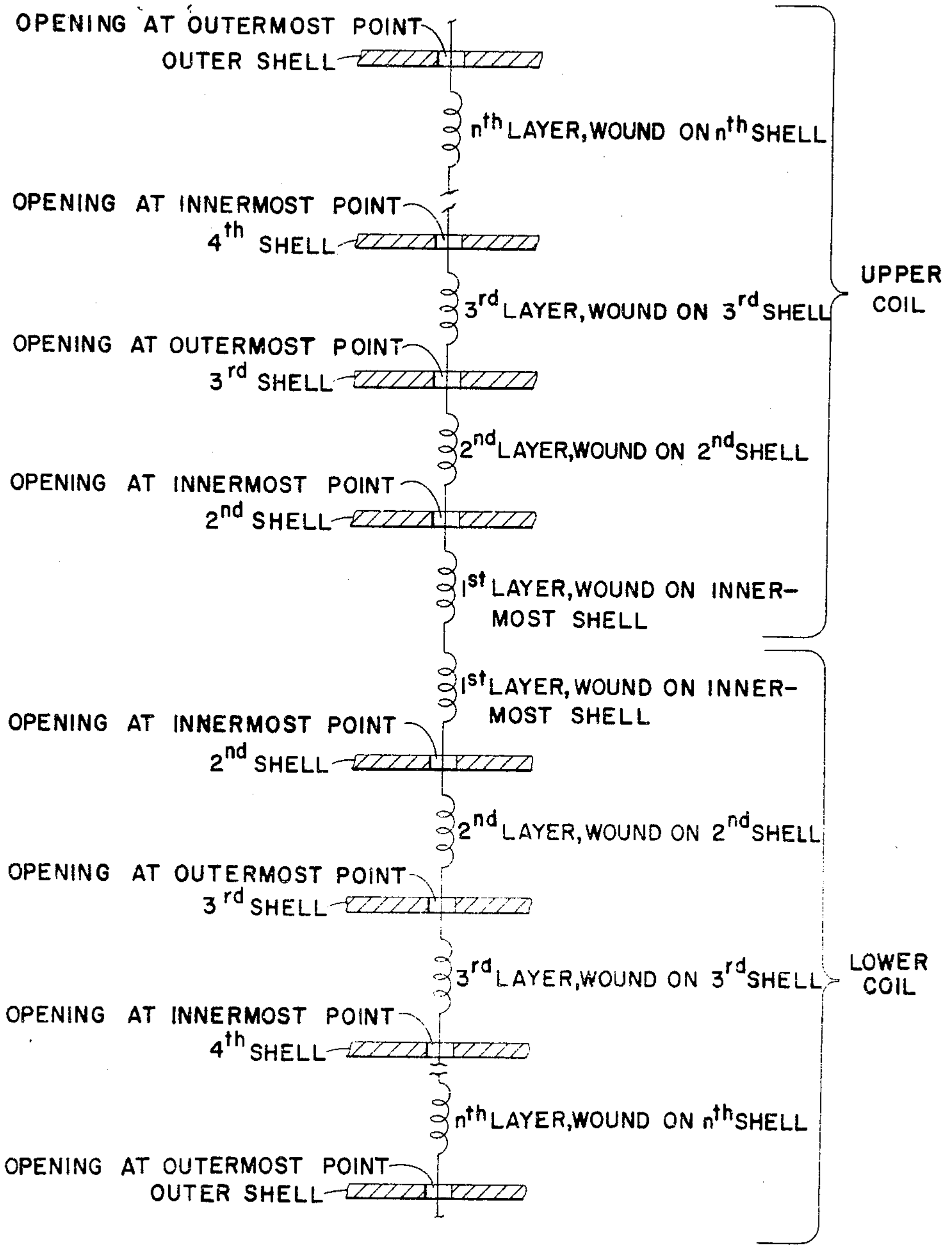
FIGURE 7 is a schematic diagram illustrating one way of winding the coil.

A complete coil may, for example, be wound in the following manner. With reference now to FIGURE 7, beginning with the innermost or first layer of one coil portion, which coil portion will be referred to as the "upper" coil portion (see FIGURE 3) to facilitate discussion, it may be wound first by beginning at the innermost point of the layer (a point lying in a plane passing through the longitudinal axis of the coil and perpendicular to plane 38) and progressing to an outermost point adjacent plane 38.

Upon completion of this first layer, which now encircles one-half of the duct, the conductor is then bent downwardly and wound to form the innermost or first layer of the opposite or "lower" coil portion (see coil portion **24*b* of FIGURE 3), this layer being wound from its outermost point to its innermost point and encircling the other half of the duct. The free ends of the conductor forming the aforementioned innermost layers of the upper and lower coil portions are now both located at the inside of each layer, i.e., in the plane passing through the longitudinal axis of the coil and perpendicular to plane 38. These free ends of the conductor may now be passed through oppositely disposed openings, similar to opening 37** (see FIGURE 4), in the next supporting or second shell for the next or second layer. After installation of the second shell, the next or second layer of each coil portion may now be wound thereon by progressing from their innermost point to their outermost point. The free ends of the conductor forming the second layer are now located at an outermost point of these layers. Consequently, two openings must be suitably located in the next succeeding or third shell to permit the free ends of the conductor to be passed therethrough for formation of the next succeeding or third layer. Thus, the third layer of each coil portion may now be wound from its outermost point to its innermost point. The procedure described in connection with the second and third layers may now be repeated until the desired number of layers have been wound. This arrangement for forming the coil has the advantages of short terminal leads and ease of introducing and removing the coolant since the terminal leads may be located adjacent each other.

Figure 8:
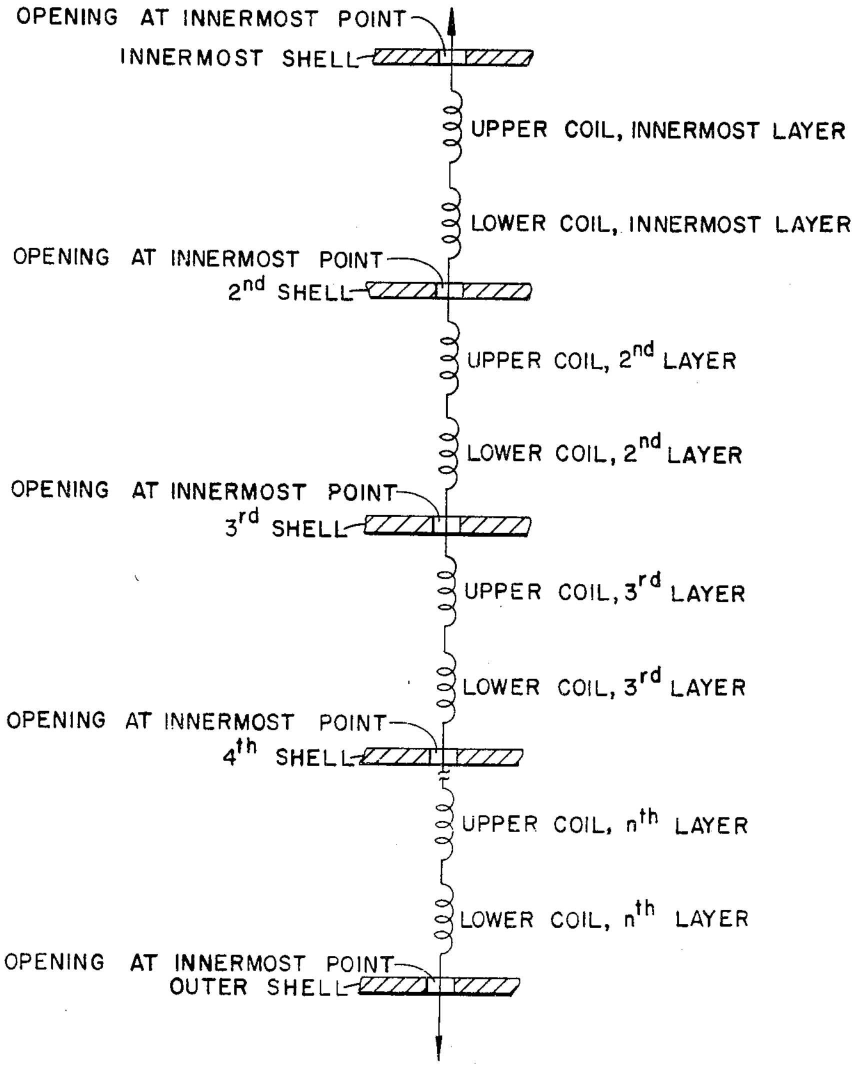
FIGURE 8 is a schematic diagram illustrating another way of winding the coil.

Other arrangements for forming the coil will readily occur to those experienced in the art. For example, the coil may also be wound with a lesser number of crossovers through the shells. This may be accomplished in the following manner. With reference now to FIGURE 8, the innermost layers of each coil portion are wound in the manner described hereinabove in connection with FIGURE 7. However, instead of successively winding each additional layer of each coil portion in the manner described in connection with FIGURE 7, each circumferential layer of the coil is wound before making a crossover through a shell. Thus, upon completion of the innermost layer of each portion, a single crossover through the next succeeding or second shell at an innermost point is made with the free end of the conductor. The next succeeding or second layer of, for example, the upper coil portion is then wound from its innermost point to its outermost point.

Thereafter the conductor may be bent down and the layer for the lower coil portion then wound from its outermost point to its innermost point. A single crossover through the next succeeding or third shell may now be made and the next succeeding or third layer of both coil portions wound in the manner just described. The procedure is repeated until the desired number of layers have been wound.

Other arrangements for interconnecting the conductors comprising the coil and/or connecting the coil to more than one source of current will readily occur to those skilled in the art. For example, although provision of a serially wound coil connected to a single source of current is most desirable for certain purposes since this insures that the same current will flow in all parts of the coil, this is not essential to the invention; and other arrangements, which provide the required magnetic field, may be preferred or dictated by design or operational requirements.

Heat leak into the low temperature or interior region of the coil along the two electrical leads of the coil is inevitable since these leads must be exposed at some point to room temperature. Even for uninsulated leads the magnitude of this heat leak is relatively small and should not exceed 5 to 10% of the total heat load. However, if the warm ends of these leads are maintained at about liquid nitrogen temperature, the aforementioned magnitude of heat leak may be substantially reduced.

Figure 9:
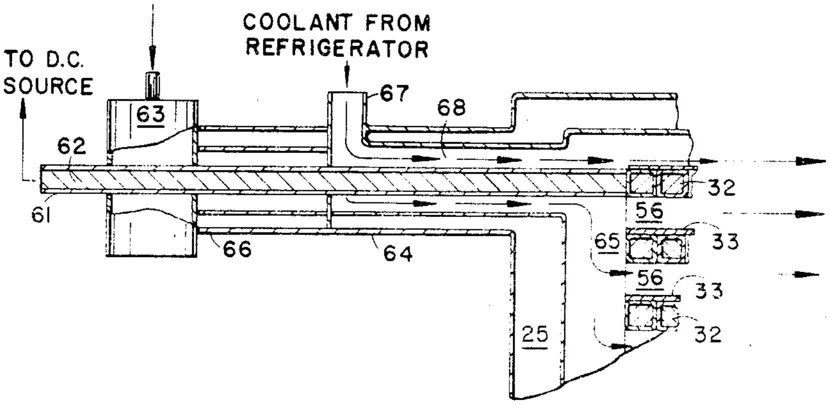
FIGURE 9 is a sectional view of one arrangement for introducing the coolant into the coil.

FIGURE 9 illustrates one arrangement for maintaining heat leak at a minimum value while permitting connection of the coil to a source of current. As shown in FIGURE 9, an exposed portion 61 of an electrical lead 62 is provided for and connected to a source of direct current (as indicated) for energizing the coil. The electrical lead 62 passes through a bath 63 of liquid nitrogen supplied from a source of liquid nitrogen (not shown), a hollow vacuum insulating section 64 communicating with a distribution header 65, and a second vacuum insulating section 66 interposed between the liquid nitrogen bath 63 and the vacuum insulating section 64 communicating with the header 65. A coolant, such as helium gas, is supplied from a conventional refrigerator (not shown) to pipe 67, passage 68 surrounding lead 62, the header 65, and the coolant passages 56 in the metal shells 33. The other electrical lead of the coil is connected to the remaining terminal of the direct current source through an arrangement substantially the same as that shown in FIGURE 9. In this case, however, the coolant may be exhausted through a pipe similar to pipe 67.

Figure 10:
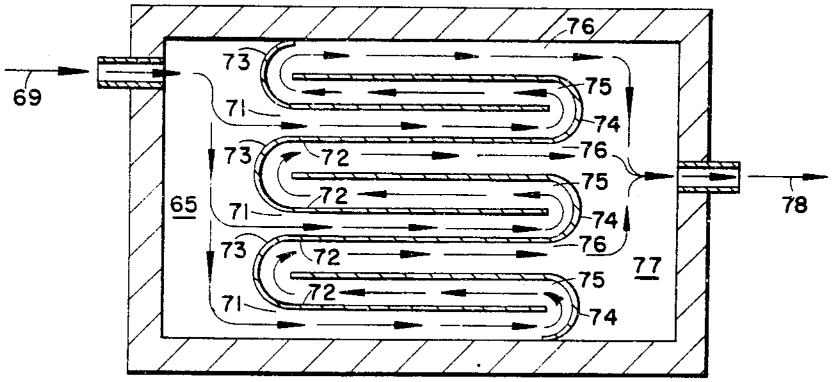
FIGURE 10 is a diagrammatic representation of one arrangement for passing the coolant through the coil.

FIGURE 10 shows diagrammatically an arrangement for causing discrete portions of the coolant gas to make a series of passes through the coil before being exhausted to a collection header. As shown in FIGURE 10, the coolant, represented by the arrow 69, is supplied under pressure to a distribution header 65 and thence to a plurality of spaced inlet coolant passages 71. Alternate shells indicated diagrammatically by the numeral 72 are connected at the inlet end of the coil as at 73 to permit the coolant to be supplied only to the inlet coolant passages 71. The opposite ends of the alternate shells 72 are interconnected at the outlet end of the coil as at 74 so that the coolant will be forced to flow through respectively re-entrant and outlet passages 75–76. The coolant is collected in the collection header 77 which is maintained at a reduced pressure. Thereafter the coolant is returned to the refrigerator as is indicated by the arrow 78.

Figure 11:
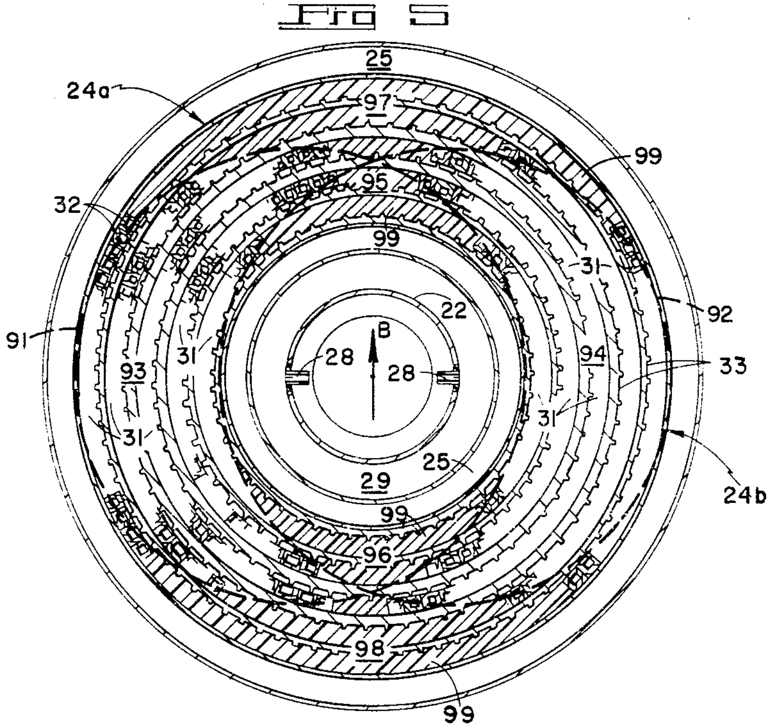
FIGURE 11 is a sectional end view showing details of a coil for providing a substantially uniform field perpendicular to the direction of gas flow.

With reference now to FIGURE 11 which is an end view taken through a coil intermediate its ends, there is illustrated one form of conductor arrangement for providing the generally desirable uniform field across the duct in the direction indicated by arrow B. As a practical matter, conductor arrangement may vary as it is determined and fixed by the field which is desired. A plurality of shells 33 and conductors 32 surrounding a duct are shown diagrammatically. Two overlapping circles 91–92, shown in phantom, delineate six regions 93–94–95–96–97 and 98. The various layers 31 of each coil portion are wound such that the longitudinal portions of the conductors forming these layers substantially fill only the regions 93 and 94. The upper portion of the conductors in regions 93 and 94, for example, form coil portion **24*a* and the lower portion of the conductors in regions 93 and 94 form coil portion 24*b*. The regions 95–96–97 and 98 are filled with a suitable substantially noncompressive and nonconducting material 99, such as, for example, a thermosetting plastic, to prevent displacement of the conductors into these regions during operation of the coil. The material 99** may be solid as shown, filling the space between the shells, or, alternately, may be formed in longitudinal strips to facilitate assembly of the coil if desired.

With reference now to FIGURES 12 and 13 which disclose means for reinforcing a high field strength coil, having conductors arranged in the manner illustrated in FIGURE 11, there is shown a set of four stress members, 111–112–113 and 114, the end portions of which are fixedly attached to respectively the innermost and outermost shells 115 and 116. A sufficient number of sets of radially arranged stress members extend along the length of the coil in spaced relationship one with another to prevent deformation of the coil.

The stress members 111–114 pass through openings 117 in each of the shells and are fixedly provided with noncompressible spacers 118 located between and in contact with pairs of oppositely disposed shells. The stress members 111–114 and spacers 118 fixedly attached thereto function to transmit stresses exerted on the inner shell 115 to the outer shell 116. During operation of the coil, the forces created thereby tend to force, for example, the inner shell 115 outwardly at and in the direction of stress members 111 and 112. Simultaneously, these forces also tend to force the inner shell 115 inwardly at and in the direction of stress members 113 and 114. Consequently, stress members 111 and 112 will be under compression and stress members 113 and 114 will be under tension if the outer shell 116 is sufficiently rigid. Obviously, if a sufficient number of stress members are provided and the stress limits of these stress members and outer shell are not exceeded, deformation of the inner shell, and consequently the coil, will be prevented.

As best shown in FIGURE 13, the outer shell 116 is rendered rigid by providing along its length a series of radial reinforcing rings 119 in spaced relationship one to another. The radial reinforcing rings 119 may be fixedly attached to the outer surface of the outer shell 116 as by welding. Since the reinforcing rings are located in the vacuum chamber 25 surrounding the coil, the provision of these rings need not materially increase the diameter of the coil.

The strength of the magnetic field to be provided will essentially determine the amount of stress exerted on or transmitted to the outer shell 116. Consequently, a sufficient number of reinforcing rings as determined by the force transmitted to the outer shell, must be provided to render the outer shell rigid. Each set of stress members may correspond with and lie in the same plane as a reinforcing ring.

Figure 14:
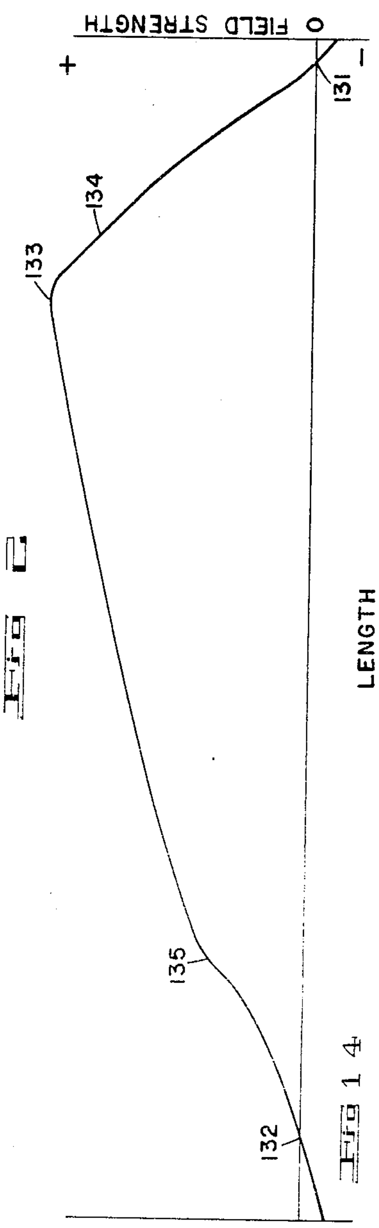
FIGURE 14 is a graphic illustration showing the variation of magnetic field along the length of the coil.

It has been previously indicated that preferably the magnetic field provided by the coil is substantially uniform across the duct and that it decreases along the length of the coil in the direction of the duct outlet. With reference now to FIGURE 14 which shows by way of example variation of the field along the length of the duct, inspection of this figure will show that the field actually reverses at points 131 and 132, i.e., at respectively a point a short distance to the left of the extreme right end of the coil and at a point a short distance to the right of the extreme left end of the coil 21 as shown in FIGURE 2. It is also important to note that the coil 21 encircles the divergent-convergent section or throat 23 and at least a portion of the combustion chamber 20. The combustion chamber or source of conductive gas may be considered to include all that is to the right and communicating with the throat of section 23 as shown in FIGURE 2.

Progressing now from point 131 in the downstream direction (from right to left of FIGURE 14) the field strength increases rapidly and reaches its maximum at about point 133 which is located a short distance downstream from the throat of section 23. At point 134, which corresponds with the throat, the field strength is preferably slightly less than its maximum value which occurs at about point 133. The effective working section of the duct may be considered that portion of the duct lying between points 132 and 134. After point 133 the field strength decreases at a more or less constant rate until point 135 is reached, whereafter the field strength decreases at a more rapid rate. Point 135 corresponds to about the downstream end of the longitudinal disposed portion of the conductors.

Although the field strength of the coil need not necessarily vary as shown in FIGURE 14 and may be adjusted to meet design conditions, the variation and extent of the field strength as shown is desirable in that, for example, it facilitates gas flow through the duct, results in desirable current flow between the electrodes, and tends to reduce or minimize short circuiting end effects.

The quantitative advantages to be gained by lowering the temperature of the magnetic coil described hereinabove will now be discussed. The degree of reduction of coil losses which can be obtained depends upon the temperature to which the coil 21 is lowered, the purity of the metal forming the conductors 32, and the strength of the magnetic field which is to be attained. Balanced against the achievable reduction of coil losses is the fact that the lower the temperature at which operation is attempted the greater will be the energy which will be irreversibly lost in running the refrigeration plant. Whether a net reduction in energy losses is achieved depends upon several factors.

One factor that must be considered is the energy that must be expended in the refrigeration plant to carry the coil heat from its steady state low operating temperature to the temperature of the refrigerator heat sink, i.e., room temperature. This energy must be added to the energy actually dissipated in the coil to obtain the total power lost or required to produce the magnetic field. The efficiency of such a refrigerator used to carry low temperature heat from the coil and deliver it at room temperature can be described in terms of the efficiency of an "ideal" Carnot refrigeration cycle, multiplied by a "mechanical" efficiency $n_R$ which represents the effect of additional mechanical and thermal losses in the actual refrigeration system. As is well-known, the Carnot efficiency relates the work W necessary to pump an amount of heat energy Q from a low temperature heat source at temperature $T_0$ to a higher temperature heat sink at temperature $T_E$ by use of an ideal heat engine. It may be shown that the total amount of energy $W_T$ lost to the heat sink is the sum of the heat Q pumped, plus the work $W_R$ expended in pumping it. Thus:

$$W_T = Q + W_R \qquad (1)$$

For a steady-state condition Q is equal to the actual joule heat released in the coil. If the magnet losses at temperature $T_0$ is $Q_{T_0}$ watts, the total energy which must be expended in producing the magnetic field may be found by multiplying $Q_{T_0}$ by a "refrigeration factor" $G_R$ where $$G_R=\left(1+\frac{1}{n_R}\frac{T_E-T_0}{T_0}\right)$$

The over-all gain that may be achieved by the use of refrigeration is proportional to the product of the means resistivity of the conducting material used in the coil and the refrigeration factor $G_R$. This defines an "effective resistivity" for the coil. In using this factor to determine the over-all gain to be achieved by the use of refrigeration two considerations are of particular interest. One consideration is the choice of the particular metal from which the conductor is fabricated and the other is the choice of an optimum operating temperature for the coil. It is, therefore, convenient to refer to a "standard" for comparison purposes. This standard may be taken to be pure copper at 300° K. (27° C.), which has a resistivity of 1.73 times $10^{-6}$ ohm-cm., designated by $\rho_s$. Thus, taking $T_E=300°$ K. (room temperature), the ratio $$\left(\frac{\rho_{(T_0)}}{\rho_s}\right)G_{R(T_0)}$$

where $\rho_{(T_0)}$ is the actual resistivity of the material at temperature $T_0$, may be evaluated as a function of temperature for any pure metal to determine the reduction in power losses achievable by refrigeration.

From the above it will now be clear that any metal for which the resistance does not drop to a value less than $1/G_R$ times the resistance of copper at 300° K. cannot possibly offer a gain. Since certain of the results to be obtained by the present invention are obviously going to depend upon the value of refrigerator mechanical efficiency, a brief discussion of its practical aspects is now in order. The value of the refrigerator mechanical efficiency $n_R$ will obviously be limited by the state of the refrigerator art for providing the desired low temperature and by the size of the refrigerator unit used. Present day small units might typically have values of $n_R$ of 0.25 or even lower, whereas large and carefully designed units might typically achieve mechanical efficiencies as high as 0.50 or higher.

In determining resistivity at cryogenic temperatures $\rho_{(T_0)}$ it is necessary to consider the factors which influence the resistivity of metals at low or cryogenic temperatures. The electrical resistivity of many nearly-pure metallic elements in the annealed state may be described as the sum of three "components." One component, the intrinsic resistivity, $\rho_0$, is associated with the pure element itself at temperature T, the second component, the impurity resistivity, $\rho_i$, arises from impurity atoms or crystal lattice defects, and the third component, the magneto-resistivity, $\rho_B$, is associated with the effect of the magnetic field. For small impurity contents, the three components add essentially independently, so that the total resistivity $\rho$ may be expressed simply as $$\rho=\rho_{0(T)}+\rho_i+\rho_B$$

To a reasonable approximation the impurity resisitivity term $\rho_i$ is independent of temperature, and thus will appear merely as an additive constant (Mattehiesen's rule). This is also roughly true for the magneto-resistivity $\rho_B$. The intrinsic resistivity $\rho_0$, however, varies markedly with temperature, especially at low temperatures.

The variation of $\rho_0$ with temperature for certain nearly pure-metals may be remarkably accurately predicted over a wide range of temperature by a theoretical expression based on quantum mechanical calculations. From this theory, a "universal resistivity curve" (the Bloch-Gruneisen function) may be derived which can be used to predict approximately the temperature dependence of the intrinsic resistivity $\rho_0$ of many pure-metals, such as, for example, copper, aluminum, sodium and the like in terms of a characteristic "resistance temperature" $\theta$ which can be found for each metal. The values of $\theta$ for pure metals are a few hundred degrees Kelvin, i.e., of the order of room temperature. The Bloch-Gruneisen function is of use in obtaining analytical expressions for the energy losses and in predicting the optimum conductor material to be used in the coil.

The aforementioned universal resistivity curve may be obtained by expressing temperature in dimensionless units, $t=T/\theta$ and resistivity in the dimensionless unit $$r=\frac{\rho(t)}{\rho(\theta)}$$

i.e., $r$ is the ratio of resistivity at temperature $t$ to that at temperature $\theta$. A significant feature of the universal resistivity curve is that at room temperature $t=1.0$ and down to temperatures of about $t=0.2$, the relative resistivity varies linearly with temperature. However, for temperatures below approximately $t=0.15$, $r$ varies as $t^5$, thus dropping rapidly to small values as the temperature approaches the vicinity of 0° K. It is in this range that the greatest gains from cooling are realized.

The intrinsic resistance of the conductor, i.e., the resistance of the conductor at temperature T, may not be reduced to an arbitrarily low figure merely by dropping the temperature, so that the energy losses in the coil can be made arbitrarily low. This is because at very low temperatures the impurity and magneto-resistivity terms become important, if not controlling.

Since the impurity and magneto-resistivity terms are characteristic of the metal used for the conductor, a discussion of the metal selected for the conductor is now in order. From a practical point of view, the metal should be inexpensive and readily obtainable in pure form. However, the most important requirements are that the metal should possess a low intrinsic resistance and the lowest possible magneto-resistance coefficient. The metals that at present appear to be most desirable are copper, aluminum, and sodium. Of these three metals, copper is attractive by reason of its ready availability in high purity form and because it is easy to work and insulate. On the other hand, aluminum appears to be somewhat superior to copper in the over-all gains which may be expected, however, sodium holds promise of far greater gains than can ever be achieved with copper.

It can be shown that at temperatures above essentially 0° K., but lower than 30° K. for copper, 39° K. for aluminum, and 20° K. for sodium the intrinsic resistance of these metals falls rapidly to a small fraction of its value at room temperature. It is at these temperatures and perhaps lower that the greatest gains from cooling can be expected.

The magneto-resistance of metals may now be considered. Magneto-resistance arises from additional small scattering losses imposed on the conduction electrons of a metal when they move in the presence of a strong magnetic field and the resulting Hall electrical fields. The magneto-resistance effect is, in general, only important at high fields and is most pronounced when the direction of current flow is perpenedicular to the field direction. For current flow parallel to the direction of the field, it is substantially lower since no Hall potentials are generated in establishing the flow. Since the effect is very small, it is only observable at very low temperatures and is not adequately predicted by theory.

As may now be apparent, although magneto-resistance is negligible at low fields, at magnetic fields of $10^5$ gauss or more it represents a substantial, if not dominant, part of the resistivity at low temperature. For this reason it may well be advantageous to pass the coolant through the coil in the direction of the duct inlet.

At high field strengths the magneto-resistance of the coil conductors adjacent the inlet of the duct will comprise the majority of the total resistance of the coil conductors at this point, which total resistance will have a value greater than the resistance of such conductors at their optimum temperature without the presence of a magnetic field of significant strength as occurs at the outlet end. Thus, on the basis of resistance, introduction of the coolant at the end of the coil adjacent the outlet end of the duct is more efficient since the presence of minimum resistance here is assured, whereas, irrespective of whether the coil conductors adjacent the inlet end are at their optimum temperature or not, this minimum value of resistance cannot be achieved at the inlet end due to the effects of magneto-resistance.

If the effect which magneto-resistance has on resistance losses in the coil is to be quantitatively determined, it is necessary that the problem be considered in greater detail than is believed justified in this discussion. Stated briefly, however, calculation of magneto-resistance in the coil requires consideration of the variation of magnetic field inside the windings themselves, since the actual increase in mean resistivity is thereby reduced. The amount of this reduction depends upon the distribution of magnetic field within the windings, which in turn depends on the distribution of current. For a basic discussion of the general problem of high field magnets and magnet losses, see The Review of Scientific Instruments, vol. 7, page 479 (1936); vol. 8, page 318 (1937); and vol. 10, page 373 (1939) by F. Bitter.

As has been pointed out hereinabove, it is necessary that the conductor be formed of a suitable high purity metal to insure that the impurity resistance term is maintained as small as possible. However, whenever the impurity resistance term is small compared to the magneto-resistance term, it may for all practical purposes be disregarded.

Figure 15:
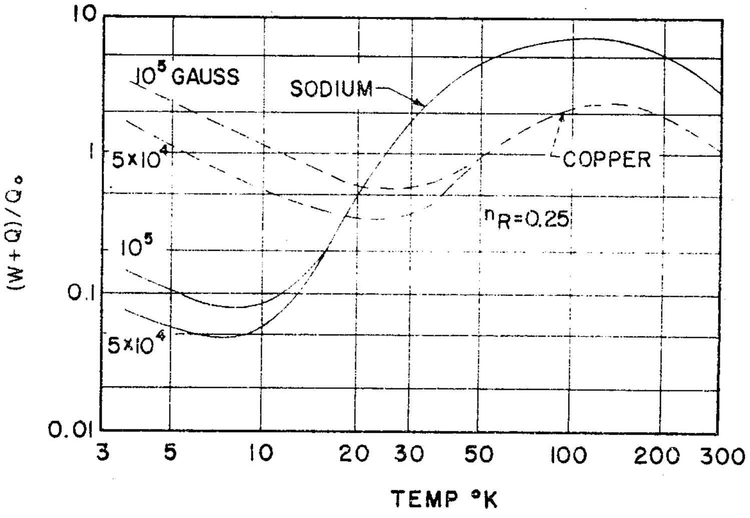
FIGURE 15 is a graphic illustration showing the variation with temperature and field strength of power requirements as compared to the power requirements of a copper coil at room temperature.

In view of the previous discussion attention is now directed to FIGURE 15, which shows the relative power requirement $(W+Q)/Q_0$ (where W is the refrigerator work, Q is the coil dissipation, and $Q_0$ is the dissipation of a copper coil at room temperature) as temperature (in degrees Kelvin) is reduced for sodium and copper coils at field strengths of $5\times10^4$ and $10^5$ gauss.

It can be seen from inspection of FIGURE 15 that unless a sufficiently low temperature is attained, the use of refrigeration will only result in an increase in the net power loss relative to copper at room temperature, since the energy required to operate the refrigerator is not compensated sufficiently by the reduction in the coil losses. It may also be seen that all of the curves exhibit minima, thus defining optimum operating temperatures. For example, from FIGURE 15 it can be seen that at $10^5$ gauss the optimum operating temperature for a copper coil is about 30° K. For sodium, the potential gains are much more striking, the predicted over-all power losses being about 4 to 8% of the power losses in a copper coil at room temperature. However, since the optimum operating temperature for sodium occurs in the neighborhood of 10° K. as compared to copper at 30° K. use of sodium will, of course, result in a slightly accentuated refrigeration problem.

For a further and more complete discussion of cryogenic coils, reference is made to "Air Core Cryogenic Magnetic Coils for Fusion Research and High Energy Nuclear Physics Applications" and "The Design of Large Cryogenic Magnet Coils" Proceedings of the 1959 Cryogenic Engineering Conference, September 1959, by R. F. Post and C. E. Taylor, Lawrence Radiation Laboratory, University of California, Livermore, California.

Having now described certain of the essential design and structural features of the coil, it will now be shown that whereas an MHD generator constructed in accordance with the teaching of the prior art can only be operated at a maximum practical pressure ratio $p_R$ for a given set of operating conditions, an MHD generator constructed in accordance with the present invention may be designed to operate at pressure ratios greater than $p_R$ for substantially the same set of operating conditions. It is this fact that provides an additional increase in the efficiency with which the energy of the conducting gas or plasma is converted to electrical energy. As used herein, "$p_R$" means the ratio of the maximum practical gas pressure at the inlet of an MHD generator duct to the minimum practical gas pressure at the duct outlet. By way of example, but not of limitation, the term "operating conditions" may be considered to include the flow rate and state of the gas, gas velocity, amount of seed to increase conductivity, the loading factor, and the magnitude and variation with length of the magnetic field.

The power generated in a small length $\Delta x$ in an MHD generator duct is:

$$\Delta P_G=\sigma u^2B^2n(1-n)A\Delta x$$

where over the length $\Delta x$ of the duct $\Delta P_G$ is the power generated, $\sigma$ is the gas conductivity, $u$ is the gas velocity, B is the magnetic field, A is the cross sectional area of the duct, and $n$ is the loading factor where $0\leqq n\leqq 1$ and the loading factor is equal to the operating terminal voltage divided by the open circuit terminal voltage.

In the length $\Delta x$ a given amount of power is required to generate the magnetic field. For a magnet which is geometrically similar at every cross section the power $\Delta P_M$ required to produce the magnetic field over the length $\Delta x$ is:

$$\Delta P_M=\left(\frac{G_R G\rho}{\lambda}\right)B^2\Delta x$$

where over the length $\Delta x$ of the duct $\Delta P_M$ is the power required to produce the magnetic field, $\rho$ is the resistivity of the coil conductors which is a function of the operating temperature of the coil, $\lambda$ is the packing factor of the coil, G is a geometry factor, and $G_R$ is a multiplier to take into account any refrigerator work necessary to cool the coils. The packing factor is the fraction of a unit area of the coil occupied by conductors, G is determined by the geometry of the coil, and $G_R$ is the refrigeration factor previously defined hereinbefore. The net power $\Delta P_{net}$ generated in the length $\Delta x$ of the generator is most conveniently expressed as:

$$\frac{\Delta P_{net}}{B^2\Delta x}=\sigma u^2 n(1-n)A-\left(\frac{G_R G\rho}{\lambda}\right)$$

In a given generator the product $\sigma u^2$ is essentially fixed by the composition of the gas and its temperature and $$\frac{G_R G\rho}{\lambda}$$

remains constant. Thus, for a given geometry and picking factor it will be seen from the preceding equation that the duct area A cannot be smaller than a given size, otherwise more power will be required to provide the magnetic field than will be generated in the generator. Inspection of the equation for the net power $\Delta P_{net}$ given immediately hereinabove will show that if A becomes small, the right-hand portion of the equation will reduce to zero or even become negative.

To permit a better understanding of the preceding discussion, it is useful to express the area A along the length $\Delta x$ of the generator in terms of the local gas pressure and the heat flux. Thus, $$A=\frac{\bar{R}TQ}{Puh_0}$$

where Q is the total heat flux at the duct inlet, T is the local gas temperature along the length $\Delta x$, P is the local gas pressure along the length $\Delta x$, $h_0$ is the stagnation gas enthalpy at the duct inlet, $\bar{R}$ is the gas constant for the particular gas being used, and $u$ is the gas velocity.

In general, the pressure P and the temperature T are the only variables in the expression given immediately hereinabove which vary appreciably along the duct. Both the pressure and temperature of the gas decrease along the length of the duct and variation of the pressure is in general much greater than variation of the temperature. For example, a typical generator constructed in accordance with the teaching of the prior art may have a pressure ratio of 16:1 from inlet to outlet, while having a temperature ratio of less than 2:1 from inlet to outlet. Therefore, the temperature of the gas may be considered to be essentially constant for small variations in pressure. Using this simplification, the expression for net power given hereinabove may now be expressed as:

$$\frac{\Delta P_{net}}{A\Delta x}=\left[\sigma u^2 n(1-n)-\left(\frac{G_R G\rho}{\lambda}\right)\left(\frac{uh_0}{RTQ}\right)P\right]B^2$$

where the quantities in parentheses is the second term within the brackets are considered to remain constant over a small length $\Delta x$. The quantity $$\frac{\Delta P_{net}}{A\Delta x}$$

is the net power generated per unit volume. As the pressure P increases, the second term will get larger thereby making the values within the brackets smaller. As a limit, if the pressure P is high enough, power goes to zero. Thus, it will now be seen that if P goes high enough, the net power per unit volume will be zero or even negative. It will now be apparent that there is a maximum practical pressure that may exist at the duct inlet, for example, and that this pressure determines a maximum practical pressure ratio $p_R$ that may exist.

It is now possible to compare an MHD generator constructed in accordance with the teaching of the prior art and an MHD generator constructed in accordance with the present invention. For coils of similar geometry, the factor $$\frac{G_R R\rho}{\lambda}$$

may be as much as 10 times larger for coils at room temperature than for coils at cryogenic temperatures. Thus, for the same heat flux and inlet conditions of the gas the second term within the brackets in the equation given immediately hereinabove is 10 times larger for coils at room temperature than for coils at cryogenic temperatures for the same value of gas pressure. This means that for a given set of operating conditions a higher pressure may be used in a generator constructed in accordance with the present invention and using cryogenic coils than in one constructed in accordance with the teaching of the prior art and using coils at room temperature.

If therefore follows from the preceding discussion that if $p_R$ is the maximum practical pressure ratio for a generator having coils cooled to room temperature and a given set of operating conditions, a generator constructed in accordance with the present invention and having substantially the same set of operating conditions may be designed to have a pressure ratio greater than the $p_R$ that would otherwise be practically possible. For example, the divergent duct of a conventional generator may be extended in the inlet direction to provide a smaller inlet cross sectional area without any decrease in efficiency. In fact, an increase in efficiency can be obtained. On the other hand, the same elongation of the duct of a properly designed conventional generator would actually result in a decrease in efficiency for the reasons given hereinbefore.

It will now be readily understood that a specific maximum value of $p_R$ (the maximum practical pressure ratio for a generator having coils cooled to room temperature) cannot be given since many factors of generator design that are variable over more or less wide limits determine the exact pressure ratio. It is essential, however, that it be understood that a maximum practical pressure ratio $p_R$ exists for MHD generators constructed in accordance with the prior art teachings and that whatever this pressure ratio may be, it may be exceeded by a generator constructed in accordance with the present invention with all the result advantages.

By way of example, but not of limitation, in a power plant of 500 megawatts nominal capacity which includes a conventional MHD generator of the type described in patent application Serial Number 8,566, filed February 15, 1960, having copper coils cooled to room temperature the MHD generator may have the following operating characteristics: A plasma or gas comprising the products of combustion of fuel oil and a nitrogen-oxygen mixture of $$\frac{N_2}{O_2}$$

mole ratio equal to 1, seeded with 0.4% potassium and at a temperature of 5200° F.; a heat flux of 1000 megawatts; a preheat temperature of 2000° F.; magnetic field dissipation of 45 megawatts; a power output of 350 megawatts; and a maximum practical pressure ratio of 16:1 with gas exit at one atmosphere total pressure. In determining the above values, not only the power dissipation in the field coils has been considered, but also compressor work and the power required to make oxygen for supporting combustion of the fuel. Further, a fixed set of conditions has been assumed. Obviously, if an improvement in one or more of the conditions is possible or certain of the conditions are changed, this could permit a limited increase in the pressure ratio.

In view of the preceding discussion, it may now be clear that, due to the large decrease that may be achieved by the present invention in power dissipation necessary to provide a given field strength as provided by a conventional field coil, higher field strengths may be used without any increase in power dissipation over that of the conventional coil. Use of the higher field strengths permits the use of shorter generator lengths with a consequent reduction in duct wall area. This in turn results in a highly advantageous reduction not otherwise possible in heat transfer to the duct wall which is one of the largest single source of loss in an MHD generator. Also, from a very practical point of view which is of equal if not greater importance, a reduction in generator length will result in a reduction in generator costs.

It may now be evident that the present invention contemplates inter alia the combination of a cryogenic coil and a duct designed to operate with a higher pressure ratio across it, for the same mass flow rate and operating parameters, than is practically possible with an MHD generator constructed in accordance with the teaching of the prior art.

In addition to permitting a decrease in the power required to provide the magnetic field and the utilization of a pressure ratio greater than $p_R$, the present invention also permits operation at lower values of maximum temperature than would otherwise be practically possible. That such is in fact the case can be seen from consideration of the following discussion:

The power $P_G$ generated in an MHD generator is:

$$P_G=\sigma u^2 B^2 n(1-n)V$$

where $\sigma$ is the gas conductivity, $u$ is the gas velocity, B is the magnetic field strength, V is the volume of the duct, and $n$ is the loading factor where $1\geqq n\geqq 0$.

The power $P_M$ necessary to provide the magnetic field is $$P_M=\frac{G_R G\rho}{\lambda}B^2 L$$

where G is the geometry factor, $G_R$ is the refrigeration factor which takes into account the increase in power requirements due to refrigerator work, $\rho$ is the resistivity of the conductors, $\lambda$ is the packing factor, and L is the length of the generator duct.

The net power output $P_{net}$ of the generator is the power generated in the generator less the power necessary to provide the magnetic field or $$P_{net}=\sigma u^2 B^2 n(1-n)V\left[1-\left(\frac{G_R G\rho}{\lambda}\right)\frac{L}{V}\frac{1}{\sigma u^2 n(1-n)}\right]$$

Assume now that for a given conventional MHD generator of fixed size a coil cooled to cryogenic temperatures can be substituted for its copper coil cooled to about room temperature and that the cryogenic coil is designed such that the net power output is the same for both types of generators. Since the net power output is the same, the following equality may be written wherein the generator with conventional coils is denoted by the subscript 1 and the generator with cryogenic coils is denoted by the subscript 2:

$$\sigma_1 u_1^2 B_1^2 n(1-n) V\left[1-\left(\frac{G_R G_\rho}{\lambda}\right)_1 \frac{L}{V} \frac{1}{\sigma_1 u_1^2 n(1-n)}\right]=$$

$$\sigma_2 u_2^2 B_2^2 n(1-n) V\left[1-\left(\frac{G_R G_\rho}{\lambda}\right)_2 \frac{L}{V} \frac{1}{\sigma_2 u_2^2 n(1-n)}\right]$$

Since, as pointed out hereinbefore, the term $$\frac{G_R G_\rho}{\lambda}$$

is 10 times larger for conventional coils at room temperature than that for cryogenic coils constructed in accordance with the present invention, it is obvious that:

$$\left(\frac{G_R G_\rho}{\lambda}\right)_2 = 0.1 \cdot \left(\frac{G_R G_\rho}{\lambda}\right)_1$$

Solving the left-hand portion of the equality for $\sigma_2 u_2^2$ and substituting in the right-hand portion of the equality it may be shown that:

$$\sigma_2 u_2^2 = \frac{G_R G_\rho}{\lambda}_1\left[0.1-\left(\frac{B_1}{B_2}\right)^2\right]\frac{L}{Vn(1-n)}+\sigma_1 u_1^2\left(\frac{B_1}{B_2}\right)^2$$

Now the product $\sigma u^2$ is generally a function only of the stagnation temperature of the gas. Further, it would be very desirable if the same amount of power could be produced using a smaller value of $\sigma u^2$. For the case where $B_1=B_2$, it can be shown that:

$$\sigma_2 u_2^2 = \sigma_1 u_1^2\left(1-0.9\frac{P_{M_1}}{P_{G_1}}\right)$$

For conventional copper coils, $$\frac{P_{M_1}}{P_{G_1}}$$

is of the order of 10%, i.e., the power necessary to provide the magnetic field is about 10% of the power generated in the generator. Thus $$\sigma_2 u_2^2 = 0.91 \sigma_1 u_1^2$$

From the above equation it may now be seen that the use of a cryogenic coil in accordance with the present invention does, in fact, permit the production of the same amount of power using a smaller value of $\sigma u^2$.

However, as pointed out hereinbefore and as may now be evident, greatly increased field strengths are possible with a cryogenic coil without increasing the amount of power required to provide the magnetic field. Further, if $B_2$ is greater than $B_1$, greater gains may be obtained since the power generated in a given size MHD generator is proportional to the magnetic field squared. Thus, if $B_2$ is increased such that $B_2^2=2B_1^2$, it can be shown that:

$$\sigma_2 u_2^2 = \sigma_1 u_1^2\left[0.5-0.4\frac{P_{M_1}}{P_{G_1}}\right]$$

If $$\frac{P_{M_1}}{P_{G_1}}$$

is again taken as 10%, then:

$$\sigma_2 u_2^2 = 0.46 \sigma_1 u_1^2$$

It may now be evident that a considerable decrease in gas temperature may in fact be effected by a generator constructed in accordance with the present invention. Thus, by permitting a reduction in the power required by the coil and/or operation of the coil at higher field strengths, a generator constructed in accordance with the present invention may be designed to operate, as compared to prior art generators, at lower gas temperatures and still produce the same net power output.

The various features and advantages of the invention are thought to be clear from the foregoing description. Various other features and advantages not specifically enumerated will undoubtedly occur to those versed in the art, as likewise will many variations and modifications of the embodiments of the invention illustrated, all of which may be achieved without departing from the spirit and scope of the invention as defined by the following claims.

I claim:

1. In a magnetohydrodynamic generator for generating an electromotive force by relative movement of an electrically conductive gas and a magnetic flux the combination comprising: a duct for conveying the electrically conductive gas; electrodes within the duct for conducting electric current under the influence of the electromotive force; coil means substantially surrounding at least a portion of said duct for supplying magnetic flux thereacross; and means for passing a coolant through said coil in the direction of the inlet of said duct to cool said coil as a whole along said duct to about its optimum cryogenic temperature.

2. In a magnetohydrodynamic generator for generating an electromotive force by relative movement of an electrically conductive gas and a magnetic flux the combination comprising: a duct for conveying the electrically conductive gas; electrodes within the duct for conducting electric current under the influence of the electromotive force; a conductor forming first and second serially connected coil portions oppositely disposed around said duct; means electrically insulating said conductor, said coil portions comprising a plurality of spaced layers of said conductor and defining an annular inner surface, said coil portions having a transverse dimension greater in a first direction than in a second direction; means cooperating with said coil portions to resist compressive forces in said first direction and tensile forces in said second direction; and means for passing a coolant between at least some of said layers in the direction of the inlet of said duct to cool said first and second coil portions as a whole along said duct to about their optimum cryogenic temperature.

3. In a magnetohydrodynamic generator for generating an electromotive force by relative movement of an electrically conductive gas and a magnetic flux the combination comprising: a duct for conveying the electrically conductive gas; electrodes within the duct for conducting electric current under the influence of the electromotive force; a conductor forming first and second serially connected coil portions oppositely disposed around said duct and spaced therefrom; means for electrically insulating said conductor, said coil portions comprising a plurality of layers of said conductor and defining an annular inner surface; support means for maintaining adjacent layers in spaced relationship; said coil portions having a transverse dimension greater in a first direction than in a second direction; means cooperating with said support means to resist compressive forces in said first direction and tensile forces in said second direction to prevent deformation of said coil portions; and means for passing a coolant through said coil portions between at least some of said layers in the direction of the inlet of said duct to cool said first and second coil portions as a whole along said duct to about their optimum cryogenic temperature.

4. In a magnetohydrodynamic generator for generating an electromotive force by relative movement of an electrically conductive gas and a magnetic flux the combination comprising: a duct for conveying the electrically conductive gas proportioned to provide a pressure ratio greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature; electrodes within the duct for conducting electric current under the influence of the electromotive force; and coil means cooled to at least about its optimum cryogenic temperature for supplying the magnetic flux.

5. In a magnetohydrodynamic generator for generating an electromotive force by relative movement of an electrically conductive gas and a magnetic flux the combination comprising: a duct for conveying the electrically conductive gas proportioned to provide a pressure ratio along its length greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature; electrodes within the duct for conducting electric current under the influence of the electromotive force; and coil means cooled to less than $-150^\circ$ centigrade for supplying the magnetic flux.

6. The method of generating an electromotive force by relative movement of an electrically conductive gas and a magnetic flux comprising: providing a magnetic flux; causing an electrically conductive gas to flow through said magnetic flux at an angle thereto with a pressure ratio greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature; and cooling the means for providing said magnetic flux to at least about its optimum cryogenic temperature.

7. The method of generating an electromotive force by relative movement of an electrically conductive gas and a magnetic flux comprising: providing a magnetic flux; causing an electrically conductive gas to flow through said magnetic flux at an angle thereto with a pressure ratio across said magnetic flux greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature to generate an electromotive force; and cooling the means for providing said magnetic flux to less than $-150^\circ$ centigrade.

8. The method of generating an electromotive force by relative movement of an electrically conductive gas and a magnetic flux comprising: providing a magnetic flux by passing current through a coil; causing an electrically conductive gas to flow substantially transversely through said magnetic flux by expansion through predetermined pressure ratio across said magnetic flux; and cooling the coil to at least about its optimum cryogenic temperature to permit selection of a pressure ratio greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature under normal operating conditions.

9. In a magnetohydrodynamic generator for generating an electromotive force by relative movement of an electrically conductive gas and a magnetic flux the combination comprising: a source of hot, electrically conductive gas; a heat sink; a duct for conveying said gas from said source to said sink, the pressure ratio between said source and said sink being greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature; means cooled to at least about its optimum cryogenic temperature for supplying the magnetic flux; and electrodes within the duct for conducting electric current under the influence of the electromotive force.

10. In a magnetohydrodynamic generator for generating an electromotive force by relative movement of an electrically conductive gas and a magnetic flux the combination comprising: a source of hot, electrically conductive gas; a heat sink; a duct having an inlet and an outlet for conveying said gas from said source to said sink, the pressure ratio between said source and said sink being greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature; electrically-conductive coil means cooled to cryogenic temperatures for supplying the magnetic flux, said means having a first end portion substantially surrounding at least a portion of said source and a middle portion and second end portion substantially surrounding said duct, said magnetic flux increasing rapidly to a maximum value at about the inlet of said duct and then decreasing to zero at about the outlet of said duct; and electrodes within the duct for conducting electric current under the influence of the electromotive force.

11. In a magnetohydrodynamic generator for generating an electromotive force by relative movement of an electrically conductive gas and a magnetic flux the combination comprising: a source of hot, electrically conductive gas under pressure; a heat sink; a duct having an inlet and an outlet for conveying said gas from said source to said sink, the pressure ratio between said source and said sink being greater than about 16:1; electrically-conductive coil means cooled to cryogenic temperatures for supplying the magnetic flux, said means having a first end portion substantially surrounding at least a portion of said source and a middle portion and second end portion substantially surrounding said duct, said magnetic flux increasing rapidly to a maximum value at about the inlet of said duct and then decreasing to zero at about the outlet of said duct; and electrodes within the duct for conducting electric current under the influence of the electromotive force.

12. In a magnetohydrodynamic generator for generating an electromotive force by relative movement of an electrically conductive gas and a magnetic flux the combination comprising: a source of hot, electrically conductive gas under pressure; a heat sink; a duct having an inlet and an outlet for conveying said gas from said source to said sink, the presure ratio between said source and said sink being greater than about 16:1 for normal operating conditions of the generator; electrically-conductive coil means for supplying the magnetic flux, said coil means having a first end portion, a middle portion, and a second end portion, said first end portion substantially surrounding the inlet of said duct and at least a portion of said source, said middle portion substantially surrounding the majority of said duct and said second end portion substantially surrounding the outlet of said duct, said magnetic flux increasing rapidly from zero at a point in said source to a maximum value at about the inlet of said duct and then decreasing at a different rate to zero at about the outlet of said duct; means for cooling said coil means to cryogenic temperatures; and electrodes within the duct and at an angle to said magnetic flux for conducting electric current under the influence of the electromotive force.

13. The combination as defined in claim 12 and additionally including means cooperating with said coil means for resisting compressive forces substantially parallel to the direction normal to said magnetic flux and tensile forces substantially parallel to the direction of said magnetic flux for preventing substantial deformation of said coil means.

14. In a magnetohydrodynamic generator for generating an electromotive force by relative movement of an electrically conductive gas and a magnetic flux the combination comprising: a source of hot electrically conductive gas under pressure; a heat sink; electrically-conductive coil means for supplying said magnetic flux; a duct having an inlet and an outlet for conveying said gas from said source through said magnetic flux and to said sink, the pressure ratio between said source and said sink being greater than $p_R$ where $p_R$ is the ratio of the maximum practical gas pressure at the inlet to the minimum practical gas pressure at the outlet of the duct of an MHD generator wherein the means for providing said magnetic flux is maintained at essentially room temperature, said coil means including an electrically insulated insulated conductor forming first and second coil portions oppositely disposed around said duct, said coil portions being comprised of a plurality of layers of said conductor, support means for maintaining said layers in spaced relationship one with another, said coil means having a first end portion, a middle portion, and a second end portion, said first end portion substantially surrounding the inlet of said duct and at least a portion of said source, said middle portion substantially surrounding the majority of said duct intermediate said inlet and outlet and said second end portion substantially surrounding the outlet of said duct, said magnetic flux increasing rapidly from zero at a point in said source to a maximum value at about the inlet of said duct and then decreasing at a different rate to zero at about the outlet of said duct; means for cooling said conductor to cryogenic temperatures; means cooperating with said support means to resist compressive forces in a direction substantially parallel to the direction normal to said flux and tensile forces substantially parallel to the direction of said magnetic flux for preventing deformation of said coil means; and electrodes with said duct between said inlet and said outlet and at an angle to said magnetic flux for conducting electric current under the influence of said electromotive force.

References Cited by the Examiner

UNITED STATES PATENTS

| | | | |
|---|---|---|---|
| 1,084,594 | 1/1914 | Norton et al. | |
| 2,929,943 | 3/1960 | Richardson et al. | 310—64 |
| 2,959,688 | 11/1960 | Buck | 340—173.1 X |
| 2,986,905 | 6/1961 | Kocher | 62—505 |
| 3,091,709 | 5/1963 | Rosa | 310—11 |

FOREIGN PATENTS

| | | |
|---|---|---|
| 515,033 | 11/1920 | France. |
| 1,161,079 | 3/1958 | France. |

OTHER REFERENCES

Publications: Reprints of papers by R. F. Post and C. E. Taylor, presented at the Cryogenic Engineering Conference University of California, September 2–4, 1959, in Advances in Cryogenic Engineering, vol. 5; pp. 13 to 37, 1960; entitled Air Core Cryogenic Magnet Coils for Fusion Research and High-Energy Nuclear Physics Application; pp. 13 to 30, and Design of Large Cryogenic Magnet Coils; pp. 31 to 37.

MILTON O. HIRSHFIELD, *Primary Examiner.*

DAVID X. SLINEY *Examiner.*